United States Patent
Hua et al.

(10) Patent No.: US 12,175,094 B1
(45) Date of Patent: Dec. 24, 2024

(54) FAST AND FLEXIBLE DATA CAPACITY UPGRADE VIA EFFICIENT RECONFIGURATION

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 29 days.

(21) Appl. No.: 18/366,817

(22) Filed: Aug. 8, 2023

(51) Int. Cl.
G06F 12/00 (2006.01)
G06F 3/06 (2006.01)

(52) U.S. Cl.
CPC .......... *G06F 3/0619* (2013.01); *G06F 3/0632* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 10,430,279 B1* | 10/2019 | Dittia | G06F 3/0656 |
| 2021/0181958 A1* | 6/2021 | Fujii | G06F 3/0632 |
| 2022/0066658 A1* | 3/2022 | Hua | G06F 3/0644 |
| 2022/0113875 A1* | 4/2022 | Hua | G06F 3/0605 |

* cited by examiner

*Primary Examiner* — Daniel D Tsui
(74) *Attorney, Agent, or Firm* — Anderson Gorecki LLP

(57) ABSTRACT

New drives numbering fewer than a RAID width W are added to a primary drive array of K=W+1 sequentially-ordered original drives with same-size sequentially-ordered cells, where RAID groups are sequentially ordered and distributed such that a first cell of each sequentially-ordered drive contains a RAID group member in the sequential order of the protection groups and subsequent cells of each original drive in sequence contain members in the sequential order, wrapped. The new drives are added by selecting a subset of the original drives adjacent to the new drives such that the selected new drives and original drives total W, selecting a number of sequential cell indices equal to the number of new drives, and relocating protection group members in the selected sequential cell indices on the selected original drives to the new drives such that free space is created across W cells of each of the selected cell indices.

20 Claims, 10 Drawing Sheets

Storage Resource Pool 205

Production Volume 240

| cell/disk | 1 | 2 | 3 | 4 | 5 | 6 | 7 | 8 | 9 |
|---|---|---|---|---|---|---|---|---|---|
| 1 | a | b | c | d | e | f | | | |
| 2 | b | c | d | e | f | a | | | |
| 3 | c | d | e | f | a | b | | | |
| 4 | d | e | f | a | b | c | | | |
| 5 | e | f | a | b | c | d | | | |

Figure 4A

| cell/disk | 1 | 2 | 3 | 4 | 5 | 6 | 7 | 8 | 9 |
|---|---|---|---|---|---|---|---|---|---|
| 1 | a | b | c | d | | | | | |
| 2 | b | c | d | e | | | | | |
| 3 | c | d | e | f | | | | | |
| 4 | d | e | f | a | b | c | e | f | a |
| 5 | e | f | a | b | c | d | f | a | b |

Figure 4B

| cell/disk | 1 | 2 | 3 | 4 | 5 | 6 | 7 | 8 | 9 |
|---|---|---|---|---|---|---|---|---|---|
| 1 | a | b | c | d | p | p | p | p | p |
| 2 | b | c | d | e | q | q | q | q | q |
| 3 | c | d | e | f | r | r | r | r | r |
| 4 | d | e | f | a | b | c | e | f | a |
| 5 | e | f | a | b | c | d | f | a | b |

Figure 5A

| cell/disk | 1 | 2 | 3 | 4 | 5 | 6 | 7 | 8 | 9 |
|---|---|---|---|---|---|---|---|---|---|
| 1 | a | b | c | d | e |   |   |   |   |
| 2 | b | c | d | e |   | a |   |   |   |
| 3 | c | d | e |   | a | b |   |   |   |
| 4 | d | e |   | a | b | c | e |   | a |
| 5 | e |   | a | b | c | d |   | a | b |

Figure 5B

| cell/disk | 1 | 2 | 3 | 4 | 10 | 5 | 6 | 7 | 8 | 9 |
|---|---|---|---|---|---|---|---|---|---|---|
| 1 | a | b | c | d | | p | p | p | p | p |
| 2 | b | c | d | e | | q | q | q | q | q |
| 3 | c | d | e | f | | r | r | r | r | r |
| 4 | d | e | f | a | | b | c | e | f | a |
| 5 | e | f | a | b | | c | d | f | a | b |

Figure 6A

| cell/disk | 1 | 2 | 3 | 4 | 10 | 5 | 6 | 7 | 8 | 9 |
|---|---|---|---|---|---|---|---|---|---|---|
| 1 | a | b | c | d | e | p | p | p | p | p |
| 2 | b | c | d | e | f | q | q | q | q | q |
| 3 | c | d | e | f | a | r | r | r | r | r |
| 4 | d | e | f | a | b | | | | | |
| 5 | e | f | a | b | c | c | d | f | a | b |

Figure 6B

| cell/disk | 1 | 2 | 3 | 4 | 5 | 6 |
|---|---|---|---|---|---|---|
| 1 | a | b | c | d | e | f |
| 2 | b | c | d | e | f | a |
| 3 | c | d | e | f | a | b |
| 4 | d | e | f | a | b | c |
| 5 | e | f | a | b | c | d |

| | 1 | 2 | 3 | 4 | 5 |
|---|---|---|---|---|---|
| | p | p | p | p | p |
| | q | q | q | q | q |
| | r | r | r | r | r |
| | | | | | |
| | | | | | |

Figure 7A

| cell/disk | 1 | 2 | 3 | 4 | 5 | 6 | 7 | 8 |
|---|---|---|---|---|---|---|---|---|
| 1 | a | b | c | d | e | f | | |
| 2 | b | c | d | e | f | a | | |
| 3 | c | d | e | f | a | b | | |
| 4 | d | e | f | a | b | c | | |
| 5 | e | f | a | b | c | d | | |

| | 1 | 2 | 3 | 4 | 5 |
|---|---|---|---|---|---|
| | p | p | p | p | p |
| | q | q | q | q | q |
| | r | r | r | r | r |
| | | | | | |
| | | | | | |

Figure 7B

| cell/disk | 1 | 2 | 3 | 4 | 5 | 6 | 7 | 8 |
|---|---|---|---|---|---|---|---|---|
| 1 | a | b | c |   |   |   |   |   |
| 2 | b | c | d |   |   |   |   |   |
| 3 | c | d | e | f | a | b | d | e |
| 4 | d | e | f | a | b | c | e | f |
| 5 | e | f | a | b | c | d | f | a |

| 1 | 2 | 3 | 4 | 5 |
|---|---|---|---|---|
| p | p | p | p | p |
| q | q | q | q | q |
| r | r | r | r | r |
|   |   |   |   |   |
|   |   |   |   |   |

Figure 8A

| cell/disk | 1 | 2 | 3 | 4 | 5 | 6 | 7 | 8 |
|---|---|---|---|---|---|---|---|---|
| 1 | a | b | c | u | u | u | u | u |
| 2 | b | c | d | v | v | v | v | v |
| 3 | c | d | e | f | a | b | d | e |
| 4 | d | e | f | a | b | c | e | f |
| 5 | e | f | a | b | c | d | f | a |

| 1 | 2 | 3 | 4 | 5 |
|---|---|---|---|---|
| p | p | p | p | p |
| q | q | q | q | q |
| r | r | r | r | r |
| s | s | s | s | s |
| t | t | t | t | t |

Figure 8B

FAST AND FLEXIBLE DATA CAPACITY UPGRADE VIA EFFICIENT RECONFIGURATION

TECHNICAL FIELD

The subject matter of this disclosure is generally related to electronic data storage systems.

BACKGROUND

Institutional data storage systems use Redundant Array of Independent Disks (RAID) technology to maintain data availability and avoid data loss. Some storage systems configure individual disk drives as members of RAID protection groups. A RAID protection group enables a failed member to be rebuilt using the remaining non-failed members. A RAID (D+P) protection group has D data members and P parity members. The data members store data. The parity members store non-data parity information such as XORs of the data values on the data members. A failed data member can be rebuilt from the non-failed data members and the parity information. A failed parity member can be rebuilt from the data members. Locating the members of a RAID protection group on different drives therefore avoids data loss when one of the drives fails. A variety of different RAID levels with different numbers, types, and configurations of members are known, some of which can recover from simultaneous failure of multiple members.

The storage capacity of an array of K current drives can be increased by adding N new drives and creating new RAID protection groups having a RAID width W=D+P. When the number of new drives added equals the RAID width, i.e., N=W, then new RAID protection groups can be created using only the new drives. However, when N<W new drives are added, some of the existing protection group members on the current drives must be relocated to the new drives in order to free space across enough drives to enable creation of new protection groups having no more than one located on any single drive. Relocation of protection group members incurs overhead costs because it requires use of computational and memory resources that might otherwise be used to service IOs from host servers that use the data stored by the storage system.

SUMMARY

In accordance with some embodiments, an apparatus comprises at least one compute node configured to manage access of the non-volatile drives, the at least one compute node comprising at least one processor and non-transitory computer-readable memory; and a Redundant Array of Independent Drives (RAID) controller adapted to: configure a primary drive array of K=W+1 sequentially-ordered original drives with same-size sequentially-ordered cells, where protection groups stored on the primary drive array have width W and the protection groups are sequentially ordered and distributed such that a first cell of each sequentially-ordered drive contains a protection group member in the sequential order of the protection groups and subsequent cells of each original drive in sequence contain members from protection groups in the sequential order, wrapped; assign sequential indices to new drives in continuity relative to the original drives; configure the new drives with the sequentially-ordered same-size cells; select a calculated number of the original drives adjacent to the new drives such that a total of selected new drives and selected original drives equals W; select a number of sequential cell indices equal to the number of new drives; and relocate protection group members in the selected sequential cell indices on the selected original drives to the new drives such that free space is created across W cells of each of the selected cell indices.

In accordance with some embodiments, a method comprises configuring a primary drive array of K=W+1 sequentially-ordered original drives with same-size sequentially-ordered cells, where protection groups stored on the primary drive array have width W and the protection groups are sequentially ordered and distributed such that a first cell of each sequentially-ordered drive contains a protection group member in the sequential order of the protection groups and subsequent cells of each original drive in sequence contain members from protection groups in the sequential order, wrapped; and adding new drives to the primary drive array by: assigning sequential indices to the new drives in continuity relative to the original drives; configuring the new drives with the sequentially-ordered same-size cells; selecting a calculated number of the original drives adjacent to the new drives such that a total of selected new drives and selected original drives equals W; selecting a number of sequential cell indices equal to the number of new drives; and relocating protection group members in the selected sequential cell indices on the selected original drives to the new drives such that free space is created across W cells of each of the selected cell indices.

In accordance with some embodiments, a non-transitory computer-readable storage medium stores instructions that when executed by a computer perform a method comprising configuring a primary drive array of K=W+1 sequentially-ordered original drives with same-size sequentially-ordered cells, where protection groups stored on the primary drive array have width W and the protection groups are sequentially ordered and distributed such that a first cell of each sequentially-ordered drive contains a protection group member in the sequential order of the protection groups and subsequent cells of each original drive in sequence contain members from protection groups in the sequential order, wrapped; and adding new drives to the primary drive array by: assigning sequential indices to the new drives in continuity relative to the original drives; configuring the new drives with the sequentially-ordered same-size cells; selecting a calculated number of the original drives adjacent to the new drives such that a total of selected new drives and selected original drives equals W; selecting a number of sequential cell indices equal to the number of new drives; and relocating protection group members in the selected sequential cell indices on the selected original drives to the new drives such that free space is created across W cells of each of the selected cell indices.

The summary does not limit the scope of the claims or the disclosure. All examples, embodiments, aspects, implementations, and features can be combined in any technically possible way and the method and process steps may be performed in any order.

BRIEF DESCRIPTION OF THE FIGURES

FIGS. 4A and 4B illustrate redistribution of protection group members to new drives when N<W and K=W+1.

FIG. 5A illustrates the creation of new protection groups following redistribution of protection group members to new drives as shown in FIGS. 4A and 4B.

FIG. 5B illustrates further reduction of data movement due to the existence of spares.

FIGS. 6A and 6B illustrate redistribution of protection group members to new drives when N<W and (K+N)≤(2*W+1).

FIG. 7A illustrates splitting of the array and redistribution of protection group members after the split of FIGS. 6A and 6B.

FIGS. 7B and 8A illustrate reduction of steps when (K+N)>(2*W+1) drives are added.

FIG. 8B illustrates creation of new protection groups in the space created by the redistribution shown in FIGS. 7B and 8A FIGS. 9 and 10 illustrate steps associated with a method performed by the RAID controller.

Various features and advantages will become more apparent from the following detailed description of exemplary embodiments in conjunction with the drawings.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
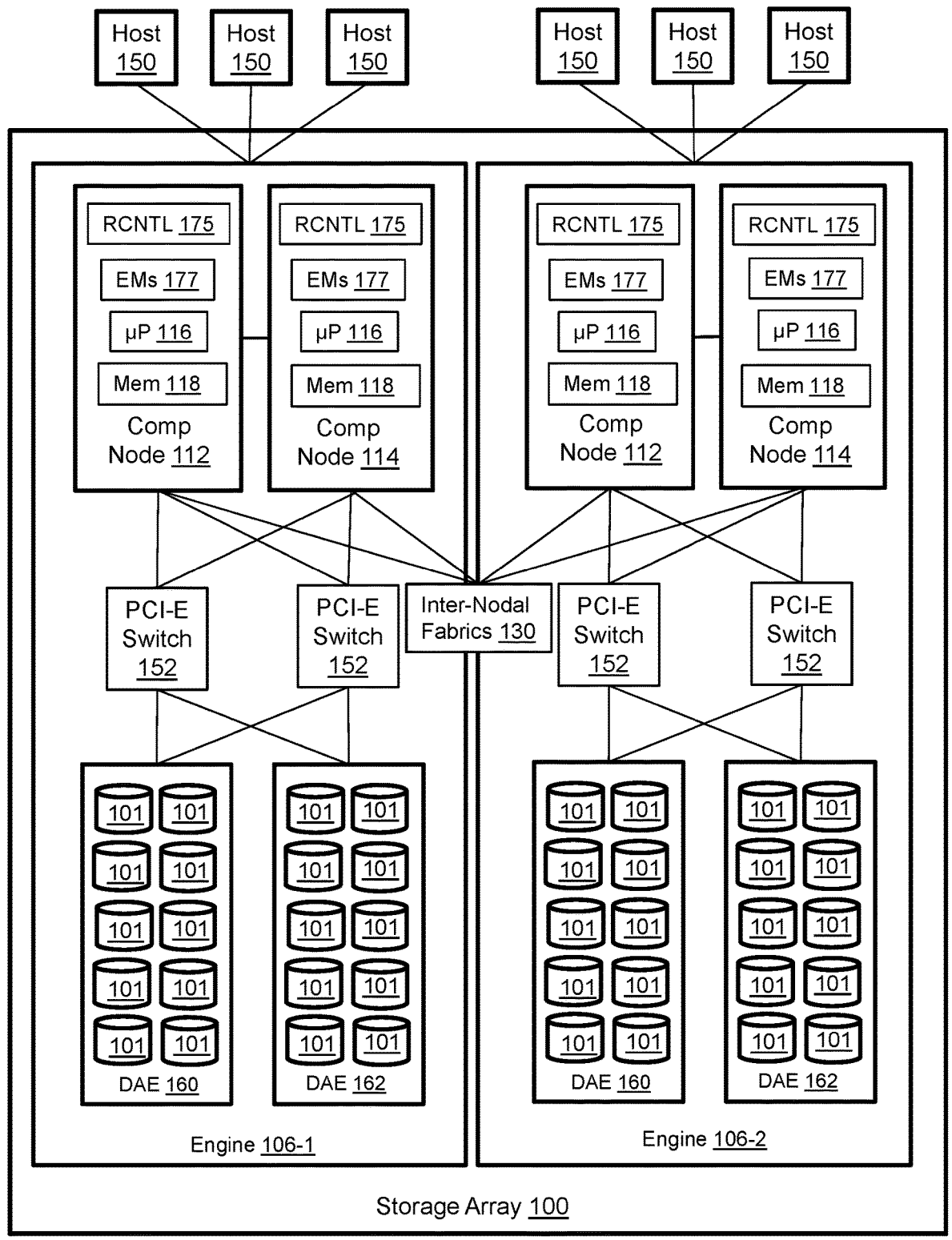
FIG. 1 illustrates a storage array with RAID controllers that mitigate or minimize data movement associated with relocation of protection group members to make space available for creation of new protection groups when storage capacity is increased by the addition of new drives.

FIG. 1 illustrates a storage array with RAID controllers 175 that mitigate or minimize data movement associated with relocation of protection group members to make space available for creation of new protection groups when storage capacity is increased by the addition of new drives. The illustrated storage array 100 includes two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130. Each compute node 112, 114 runs emulations (EMs 177) for completing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. RAID controllers 175 may include one or more of special purpose electronic components, logic, and computer program code loaded into memory 118 from the managed drives 101 and run on the processors 116. The RAID controllers coordinate with the emulations to facilitate scaling of storage capacity while mitigating data movement.

Figure 2:
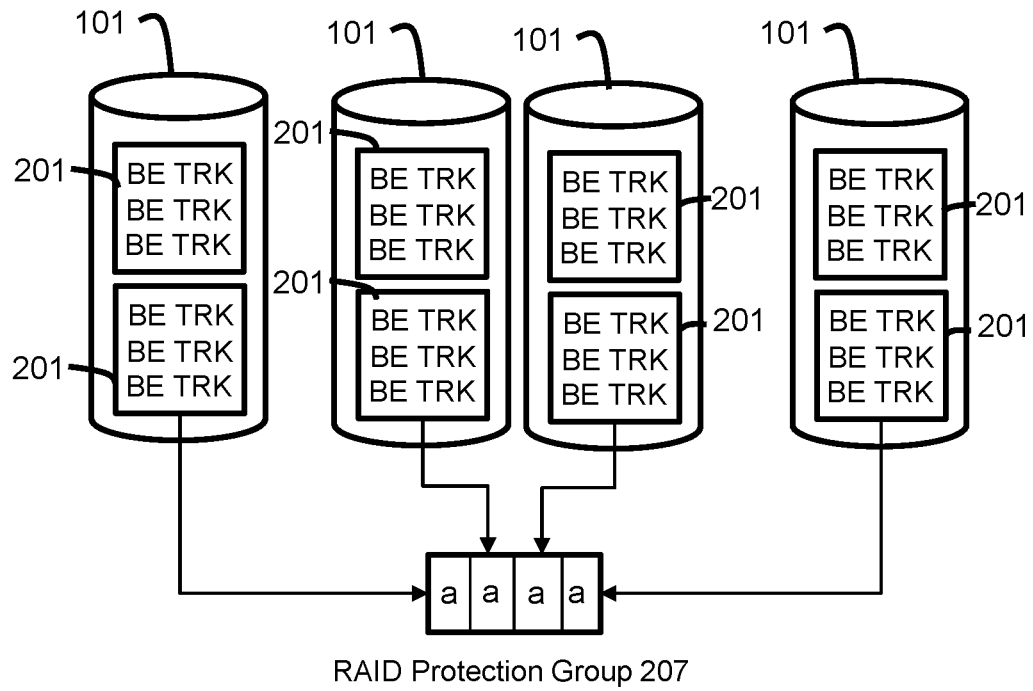
FIG. 2 illustrates layers of abstraction between the managed drives and the production volume of the storage array of FIG. 1.
Figure 2:
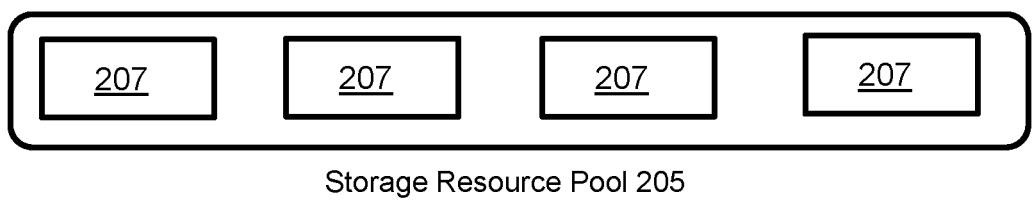
Figure 2:
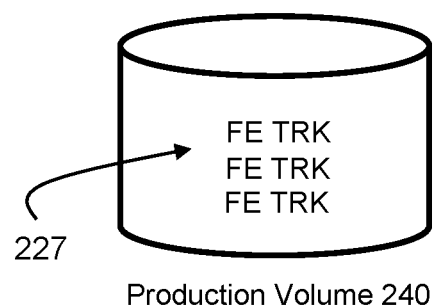

Referring to FIGS. 1 and 2, data that is created and used by instances of the host applications running on the host servers 150 is maintained on the managed drives 101. The managed drives are not discoverable by the host servers, so the storage array creates logical production storage objects such as production volume 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101.

IO services emulations running on the processors of the compute nodes maintain metadata that maps between the LBAs of the production volume 240 and physical addresses on the managed drives 101 in order to process IOs from the host servers. The basic allocation unit of storage capacity that is used by the compute nodes 112, 114 to access the managed drives is a back-end track (BE TRK). The managed drives are organized into same-size cells 201, each of which may contain multiple BE TRKs. Although individual drives can be configured as RAID group members, in the illustrated example a grouping of cells 201 from different managed drives is used to create a RAID protection group 207, such as a RAID-5 (3+1) protection group. In order to be RAID-compliant, each member of a given protection group must be on a different managed drive. In the illustrated example, each cell 201 contains one member of protection group "a" stored on a particular managed drive and other protection groups, e.g., b, c, d, and so forth, would be similarly formed. Storage resource pool 205 is a type of storage object that includes a collection of protection groups of the same RAID level. The host application data is logically stored in front-end tracks (FE TRKs) on production volume 240. The FE TRKs of the production volume are mapped to the BE TRKs on the managed drives and vice versa by tables and pointers that are maintained in the shared memory.

Figures 3A, 3B:
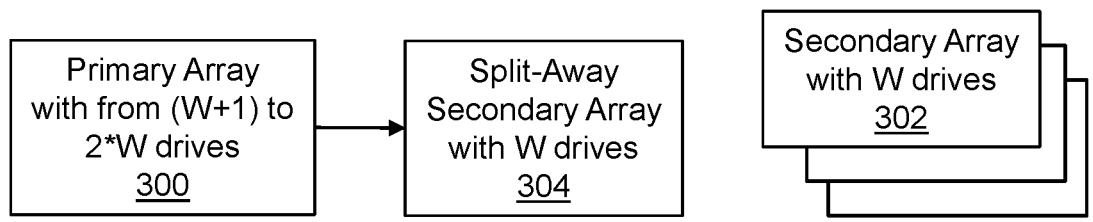
FIG. 3A illustrates primary and secondary drive arrays.
FIG. 3B illustrates an initial distribution of RAID protection group members in a primary array of W+1 drives and distribution of RAID protection group members in a secondary array of W new drives.

FIG. 3A illustrates primary and secondary drive arrays. The managed drives are organized into one primary drive array 300 and any number of secondary drive arrays 302. Each secondary drive array 302 contains exactly W drives. The primary drive array 300 contains from W+1 to 2*W drives, inclusive. When the primary drive array grows to 2*W+1 drives, a secondary drive array with W drives 304 is split-away from the primary drive array 300, thereby decreasing the number of drives in the primary drive array. As the storage capacity of the storage array is increased by adding new drives, the size of the primary array increases and decreases within the limits of W+1 to 2*W drives as secondary drive arrays are split-off and the number of secondary drive arrays increases.

FIG. 3B illustrates an initial distribution of RAID protection group members in a primary array 306 of W+1 drives and distribution of RAID protection group members in a split-away secondary array 308 of W new drives. The drives, all of which may have identical storage capacity, are organized into same-size cells of smaller storage capacity. The overall storage capacity of the primary array 306 is represented by a matrix having W+1 sequentially indexed drive columns and W sequentially indexed cell rows, where W is the RAID width, e.g., W=5 for RAID-5 (4+1) because each protection group has five members. Sequentially ordered RAID groups a, b, c, d, e, f are distributed on the primary array such that the first cell (cell 1) of each sequentially ordered drive (drives 1 through 6) contains RAID members in the sequential order of the RAID groups, i.e., members a, b, c, d, e, f in cell 1 across drives 1, 2, 3, 4, 5, 6. Subsequent cells in sequence (cells 2 through 5) of each drive contain protection group members in the sequential order relative to cell 1, e.g., b, c, d, e in cells 2, 3, 4, 5 on drive 1, such that the RAID groups are in sequential order in both the rows and columns of the representative matrix. The sequential order wraps from f to a, so cells 2 through 5 of drive 4, for example, contain members e, f, a, b. Members of individual RAID protection groups split-away secondary array 308 (and all other secondary drive arrays) are distributed across same-cell indices, which are rows in the illustrated matrix. For example, all members of protection group g are in cell 1. For each group of W new drives added to the storage array, those drives can be configured as secondary arrays. The remaining new drives are added to the primary array as will be explained in greater detail below.

FIGS. 4A and 4B illustrate redistribution of protection group members from the primary array to new drives when N<W and K=W+1, where N is the number of new drives remaining after creation of secondary arrays of W new drives (N=(N modulo W)) and K is the current number of drives in the primary array when redistribution is initiated. The new drives are assigned sequential indices 7, 8, 9 relative to the original drives 1, 2, 3, 4, 5, 6 and added to the matrix in sequential order. A calculated number of the original drives adjacent to the new drives are selected such that the total of the selected new drives and selected original drives equals W, e.g., existing drives 5 and 6 plus new drives 7, 8, and 9 totaling five drives are selected because W=5 in the illustrated example. A number of sequential cell indices (starting with 1) equal to the number of new drives, e.g., three, are selected and the protection group members in those cell indices (1-3) on the selected original drives (5 and 6) are relocated to the new drives such that free space is created across W cells of each of the selected cell indices, e.g., cells 1, 2, and 3 of drives 5, 6, 7, 8, 9. One way to represent the redistribution process is with algorithm A as shown below.

for (x=K+1; x<=K+N; x++)
   for (y=N+1; y<=W; y++)
     {move data from disk [y+K−W].cell [x−K] to disk
      [x].cell [y]}

As will be explained below, the relocation of selected protection group members creates free space for formation of new protection groups while reducing or minimizing data movement to (W−N)/W of the new cells.

FIG. 5A illustrates the formation of new protection groups following redistribution of protection group members to new drives as shown in FIGS. 4A and 4B. New protection groups p, q, r are created using the cells (1, 2, 3) that are vacated on drives 5, 6 due to data relocation along with unused cells 1, 2, 3, in the new drives 7, 8, 9. Each new protection group is located in a single cell index, e.g., all members of protection group q are in cell 2. Thus, three new five-member protection groups are created while relocating only six protection group members.

FIG. 5B illustrates further reduction of data movement due to the existence of spares. Any of the original protection groups a through f can be spare cells that are reserved for use in RAID recovery after a drive failure. In the case of spare cells, there is no data to be relocated when new drives are added. For example, if group f is a spare group, relocation of its members (shown in FIG. 5B as blank cells) does not require data movement.

FIGS. 6A and 6B illustrate redistribution of protection group members to new drives when N<W, K+ (W+1) and (K+N)≤(2*W+1). This situation may occur, for example, when a second group consisting of a single new drive 10 is added following the addition of the first new group of drives 7, 8, 9 as described above. If N≥W, one or more groups of W new drives are configured as separate arrays with horizontally distributed RAID groups across W drives as shown in FIG. 3B. The remaining new drives N=(N modulo W) are inserted into the primary array between the drives that contain relocated members and the drives that do not contain relocated members. In the illustrated example, new drive 10 is inserted between drive 4 and drive 5. The protection group members located in the first group of cells in the sequential order that have been relocated are relocated a second time to the new drive. In the illustrated example, the sequential RAID members b, c, e, f, a in row 4 over the last five drives are relocated to cells 1 through 5 of new drive 10, thereby making space available for a new RAID group to be formed using the vacated cells. RAID members and new cells are associated according to the sequential order as shown in the initial distribution pattern. Every row and column of cells contains RAID members following the sequential order of groups: a, b, c, d, e, f, wrapping around from f to a. One way to represent the redistribution process is with algorithm B below.

for (x=K+1; x<=K+N; x++)
  for (y=1; y<=W; y++)
    if (y<(K−W)) {move data from disk [y+W+1].cell [x−W−1] to disk [x].cell [y]} else {move data from disk [y+1].cell [x−W−1] to disk [x].cell [y]}

The large array is split into two separate, smaller arrays represented by separate matrices when the large array grows to 2*W+1 drives as shown in FIG. 7A. The first array/matrix with (W+1) drives is characterized by the original distribution pattern shown in FIG. 3A. The second array/matrix with W drives is characterized by the distribution pattern shown in FIG. 3B. The distribution patterns result from the application of relocation algorithms A and B as described above. The drive indices are renumbered sequentially within each array/matrix to prepare for the process to be repeated by returning to algorithm A.

FIGS. 7B, 8A and 8B illustrate reduction of steps when addition of new drives results in the condition (K+N)>(2*W+1). First, 2*W+1−K new drives are added using Algorithm B. The primary drive array is then split into two drive arrays and then the remaining new drives are added using Algorithm A. In the illustrated example, Algorithm A adds two drives to the first matrix of six drives. The highlighted areas illustrate the cells involved in data movement across drives 4 through 8. The RAID members (e, f, f, a) within the highlighted rectangle are relocated directly to their final destinations in drives 7 and 8, so the intermediate temporary steps of moving to drives 5 and 6 are avoided. RAID members (d, e) are moved from drive 4 to drives 7 and 8, so data is moved to only (W−M)/W or 3/5 of the new cells. Vacated cells and unused cells in the new drives provide the capacity for four new RAID groups (s, t, u, v).

In view of the description above it will be understood that, as storage capacity is increased by the addition of new drives, drive arrays are reconfigured alternatingly with algorithm A and algorithm B. The primary drive array may vary between W+1 and 2*W disks. All other drive arrays have exactly W drives.

Figure 9:
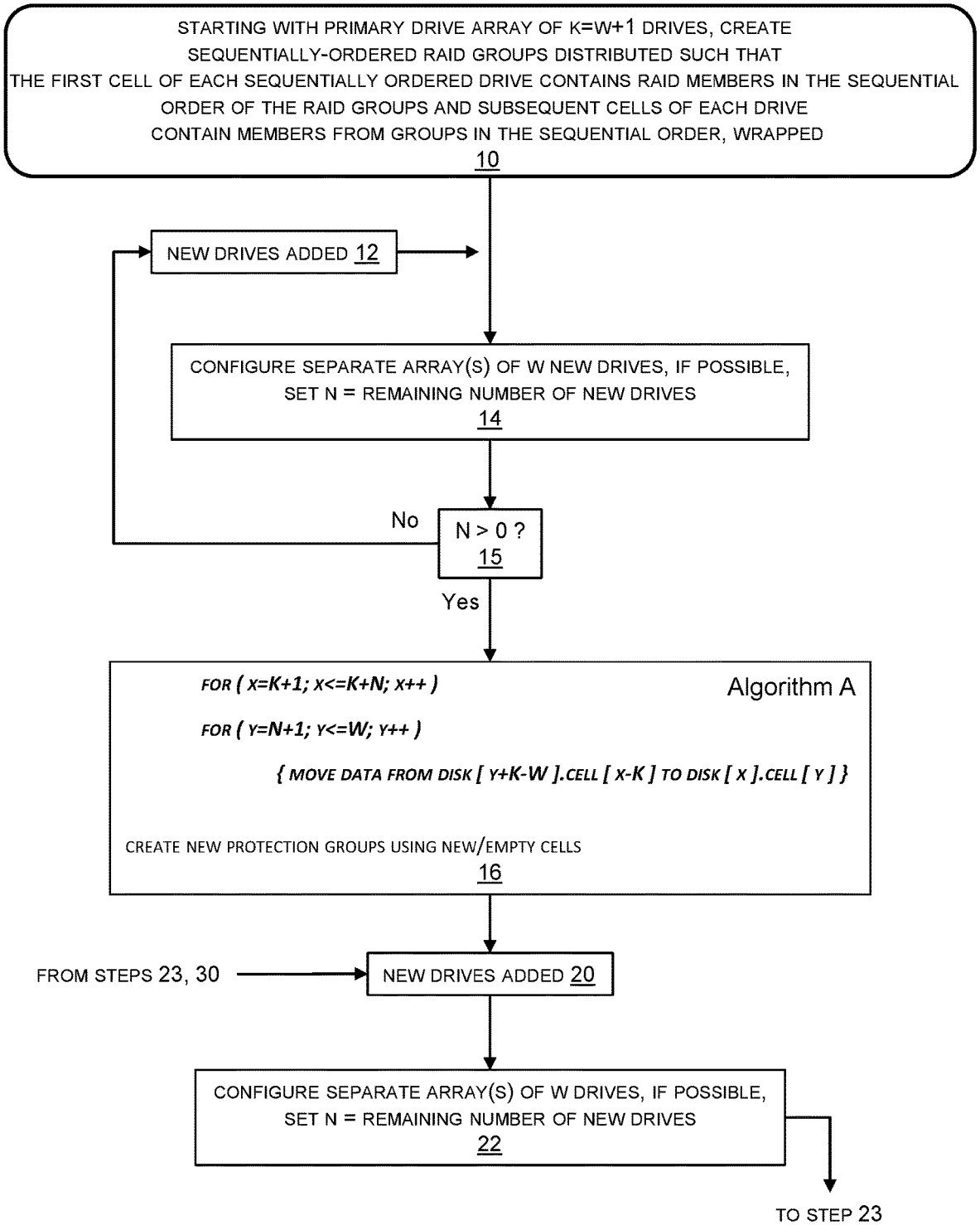
Figure 10:
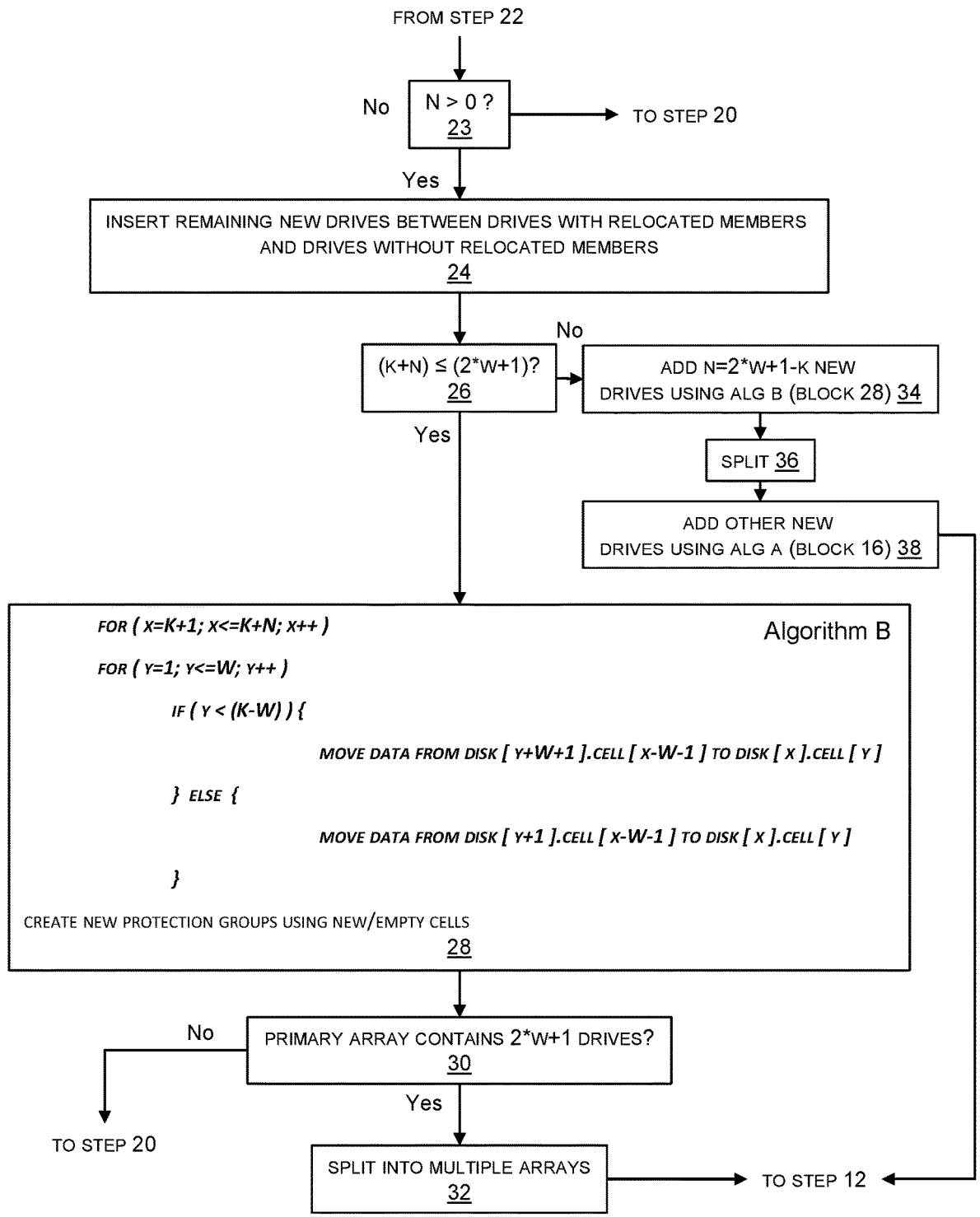

FIGS. 9 and 10 illustrate steps associated with a method performed by the RAID controller. As shown in step 10, the method begins with a primary drive array of K=W+1 sequentially ordered drives formatted with same-size sequentially-ordered cells, where W is the RAID width, sequentially ordered RAID groups are created and distributed such that the first cell of each sequentially-ordered drive contains a RAID member in the sequential order of the RAID groups and subsequent cells of each drive in sequence contain members from RAID groups in the sequential order, wrapped. New drives are added to the storage array at some later point in time, as shown in step 12. Step 14 is configuring separate secondary arrays of W new drives, if possible.

If there are fewer than W new drives, then separate secondary arrays cannot be formed with new drives alone. The variable N is set to the remainder of new drives after configuration of secondary arrays, if any. If N is greater than 0 as determined in step 15, then those N remaining drives are added to the primary array using algorithm A in step 16. If N is not greater than 0, then flow returns to step 12. Step 16 includes adding the new drives to the primary drive array in sequence and using algorithm A to redistribute RAID members in the expanded primary array. Step 16 further includes creating new protection groups using the new and vacated cells with members distributed in individual cell indices. For example, all members of new protection group x will be in cell index y.

Step 20 is adding a subsequent group of new drives. Step 22 is configuring separate secondary arrays of W new drives, if possible. If there are fewer than W new drives, then separate secondary arrays cannot be formed with new drives alone. The variable N is set to the remainder of new drives after configuration of secondary arrays, if any, and those N remainder drives are added to the primary array in sequence if it is determined in step 23 that N is greater than 0. If N is not greater than 0, then flow returns to step 20. Step 24 is inserting the remaining new drives into the primary array in sequence between the drives of the original primary array that have had at least some RAID members relocated and the drives that have not had any RAID members relocated. Step 26 is determining whether the condition (K+N)≤(2*W+1) holds true. If so, then algorithm B is used to redistribute RAID members in the expanded primary array in step 28. Step 28 further includes creating new protection groups in the new and vacated cells. Step 30 is determining whether the primary array contains 2*W+1 drives. If so, then the primary array is split into multiple arrays in step 32. Specifically, the primary array is split into another primary array of W+1 drives and a secondary array of W drives. Flow then continues to step 12. If it is determined in step 30 that the primary array does not contain 2*W+1 drives, then flow returns to step 20. If it is determined in step 26 that the condition (K+N)≤(2*W+1) does not hold true, then 2*W+1−K new drives are added to the primary drive array using Algorithm B in step 34. The primary array is then split in step 36 and the remaining new drives are added to the primary array using Algorithm A in step 38. Flow then returns to step 12.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. An apparatus, comprising:
  at least one compute node configured to manage access of the non-volatile drives, the at least one compute node comprising at least one processor and non-transitory computer-readable memory; and
  a Redundant Array of Independent Drives (RAID) controller adapted to:
    configure a primary drive array of K=W+1 sequentially-ordered original drives with same-size sequentially-ordered cells, where protection groups stored on the primary drive array have width W and the protection groups are sequentially ordered and distributed such that a first cell of each sequentially-ordered drive contains a protection group member in the sequential order of the protection groups and subsequent cells of each original drive in sequence contain members from protection groups in the sequential order, wrapped;

assign sequential indices to new drives in continuity relative to the original drives;

configure the new drives with the sequentially-ordered same-size cells;

select a calculated number of the original drives adjacent to the new drives such that a total of selected new drives and selected original drives equals W;

select a number of sequential cell indices equal to the number of new drives; and relocate protection group members in the selected sequential cell indices on the selected original drives to the new drives such that free space is created across W cells of each of the selected cell indices.

2. The apparatus of claim 1 further comprising the RAID controller being adapted to form secondary arrays of W new drives with protection groups located in single cell indices.

3. The apparatus of claim 1 further comprising the RAID controller being adapted to create new protection groups in free cells having same-cell indices.

4. The apparatus of claim 1 further comprising the RAID controller being adapted to: assign sequential indices to the new drives in continuity relative to the original drives; configure the new drives with the sequentially-ordered same-size cells; insert the new drives into the primary array in sequence between ones of the original drives that have had at least some protection group members relocated and ones of the original drives that have not had any protection group members relocated; and relocate single cell index protection group members to multiple cell indices of the original drives to restore sequential ordering of the protection group members.

5. The apparatus of claim 4 further comprising the RAID controller being adapted to form secondary arrays of W new drives with protection groups located in single cell indices.

6. The apparatus of claim 1 further comprising the RAID controller being adapted to add a subsequent group of new drives, determine that the primary array contains 2*W+1 drives, and split the primary array into another primary array of W+1 drives and a secondary array of W drives.

7. The apparatus of claim 1 further comprising the RAID controller being adapted to add a subsequent group of new drives, determine that (K+N)≤(2*W+1) and N<W, assign sequential indices to the new drives in continuity relative to the original drives, configure the new drives with the sequentially-ordered same-size cells, select a calculated number of the original drives adjacent to the new drives such that a total of selected new drives and selected original drives equals W, select a number of sequential cell indices equal to the number of new drives, and relocate protection group members in the selected sequential cell indices on the selected original drives to the new drives such that free space is created across W cells of each of the selected cell indices.

8. A method comprising:

configuring a primary drive array of K=W+1 sequentially-ordered original drives with same-size sequentially-ordered cells, where protection groups stored on the primary drive array have width W and the protection groups are sequentially ordered and distributed such that a first cell of each sequentially-ordered drive contains a protection group member in the sequential order of the protection groups and subsequent cells of each original drive in sequence contain members from protection groups in the sequential order, wrapped; and adding new drives to the primary drive array by:
assigning sequential indices to the new drives in continuity relative to the original drives;
configuring the new drives with the sequentially-ordered same-size cells;
selecting a calculated number of the original drives adjacent to the new drives such that a total of selected new drives and selected original drives equals W;
selecting a number of sequential cell indices equal to the number of new drives; and
relocating protection group members in the selected sequential cell indices on the selected original drives to the new drives such that free space is created across W cells of each of the selected cell indices.

9. The method of claim 8 further comprising forming secondary arrays of W new drives with protection groups located in single cell indices.

10. The method of claim 8 further comprising creating new protection groups in free cells having same cell indices.

11. The method of claim 8 further comprising adding a subsequent group of new drives by:
assigning sequential indices to the new drives in continuity relative to the original drives;
configuring the new drives with the sequentially-ordered same-size cells;
inserting the new drives into the primary array in sequence between ones of the original drives that have had at least some protection group members relocated and ones of the original drives that have not had any protection group members relocated; and
relocating single cell index protection group members to multiple cell indices of the original drives to restore sequential ordering of the protection group members.

12. The method of claim 11 further comprising forming secondary arrays of W new drives with protection groups located in single cell indices.

13. The method of claim 8 further comprising adding a subsequent group of new drives, determining that the primary array contains 2*W+1 drives, and splitting the primary array into another primary array of W+1 drives and a secondary array of W drives.

14. The method of claim 8 further comprising adding a subsequent group of new drives, determining that (K+N)≤(2*W+1) and N<W, and adding new drives to the primary drive array by:
assigning sequential indices to the new drives in continuity relative to the original drives;
configuring the new drives with the sequentially-ordered same-size cells;
selecting a calculated number of the original drives adjacent to the new drives such that a total of selected new drives and selected original drives equals W;
selecting a number of sequential cell indices equal to the number of new drives; and
relocating protection group members in the selected sequential cell indices on the selected original drives to the new drives such that free space is created across W cells of each of the selected cell indices.

15. A non-transitory computer-readable storage medium with instructions that when executed by a computer perform a method comprising:
configuring a primary drive array of K=W+1 sequentially-ordered original drives with same-size sequentially-ordered cells, where protection groups stored on the primary drive array have width W and the protection groups are sequentially ordered and distributed such that a first cell of each sequentially-ordered drive contains a protection group member in the sequential order of the protection groups and subsequent cells of each original drive in sequence contain members from protection groups in the sequential order, wrapped; and adding new drives to the primary drive array by:
assigning sequential indices to the new drives in continuity relative to the original drives;
configuring the new drives with the sequentially-ordered same-size cells;
selecting a calculated number of the original drives adjacent to the new drives such that a total of selected new drives and selected original drives equals W;
selecting a number of sequential cell indices equal to the number of new drives; and
relocating protection group members in the selected sequential cell indices on the selected original drives to the new drives such that free space is created across W cells of each of the selected cell indices.

16. The non-transitory computer-readable storage medium of claim 15 in which the method further comprises forming secondary arrays of W new drives with protection groups located in single cell indices.

17. The non-transitory computer-readable storage medium of claim 15 in which the method further comprises adding a subsequent group of new drives by:
assigning sequential indices to the new drives in continuity relative to the original drives;
configuring the new drives with the sequentially-ordered same-size cells;
inserting the new drives into the primary array in sequence between ones of the original drives that have had at least some protection group members relocated and ones of the original drives that have not had any protection group members relocated; and
relocating single cell index protection group members to multiple cell indices of the original drives to restore sequential ordering of the protection group members.

18. The non-transitory computer-readable storage medium of claim 17 in which the method further comprises forming secondary arrays of W new drives with protection groups located in single cell indices.

19. The non-transitory computer-readable storage medium of claim 15 in which the method further comprises adding a subsequent group of new drives, determining that the primary array contains 2*W+1 drives, and splitting the primary array into another primary array of W+1 drives and a secondary array of W drives.

20. The non-transitory computer-readable storage medium of claim 15 in which the method further comprises adding a subsequent group of new drives, determining that (K+N)≤(2*W+1) and N<W, and adding new drives to the primary drive array by:
assigning sequential indices to the new drives in continuity relative to the original drives;
configuring the new drives with the sequentially-ordered same-size cells;
selecting a calculated number of the original drives adjacent to the new drives such that a total of selected new drives and selected original drives equals W;
selecting a number of sequential cell indices equal to the number of new drives; and
relocating protection group members in the selected sequential cell indices on the selected original drives to the new drives such that free space is created across W cells of each of the selected cell indices.

* * * * *